US006772096B2

(12) United States Patent
Murakami et al.

(10) Patent No.: US 6,772,096 B2
(45) Date of Patent: Aug. 3, 2004

(54) REMOTE MAINTENANCE SYSTEM

(75) Inventors: Takashi Murakami, Kyoto (JP);
Yasuyuki Shintani, Nishinomiya (JP);
Sachio Nagamitsu, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 199 days.

(21) Appl. No.: 10/090,779

(22) Filed: Mar. 6, 2002

(65) Prior Publication Data

US 2002/0128728 A1 Sep. 12, 2002

(30) Foreign Application Priority Data

Mar. 9, 2001 (JP) ........................................ 2001-066333

(51) Int. Cl.[7] .............................................. G05B 15/02
(52) U.S. Cl. ........................................ 702/184; 700/10
(58) Field of Search ................................ 702/184, 188, 702/16; 340/539, 3.1, 825, 506; 700/17, 16, 10; 714/4, 25; 703/27; 705/54, 14

(56) References Cited

U.S. PATENT DOCUMENTS 4,567,557 A * 1/1986 Burns ........................... 702/16
6,160,477 A * 12/2000 Sandelman et al. ......... 340/506

FOREIGN PATENT DOCUMENTS

JP 2001-195119 7/2001

* cited by examiner

Primary Examiner—John Barlow
Assistant Examiner—Victor J. Taylor
(74) Attorney, Agent, or Firm—Wenderoth, Lind & Ponack, L.L.P.

(57) ABSTRACT

A remote maintenance system has a center server that is located in a service center for performing maintenance of an electrical appliance and a home server that is located in a house and monitors a status of the electrical appliance 102 in the house which are connected via a communication network. The home server includes an electrical appliance management unit that acquires a status value of the electrical appliance, a communication unit that receives from the center server a failure model which is information defining a method of deriving a decision whether the electrical appliance has failed or not from the status value, and a failure deciding unit that decides whether the electrical appliance has failed or not based on the acquired status value and the received failure model using qualitative reasoning. The center server includes a failure model updating unit that updates a failure model and sends the updated failure model to the home server via a communication unit.

37 Claims, 11 Drawing Sheets

FIG. 3

| Customer ID | Name | Postal Code | Address | Phone Number | Floor Plan |
|---|---|---|---|---|---|
| 00078723 | Katsue Isono | 123-4567 | Kadomatsu-cho 1-1, Kadomatsu-shi | 06(6378)5678 | 00078723m1 00078723m2 |
| 00078724 | Makio Isobe | 234-0056 | Moriguchi-cho 2-22, Morita-shi | 078(81)1234 | 00078724m1 |

FIG. 4

| Appliance ID | Customer ID | Manufacturer Code | Model Code | Connection Point |
|---|---|---|---|---|
| 0000001 | 00078723 | 0034 | PQ01-83 | 1K01 |
| 0000002 | 03990212 | 0034 | TV03-05 | 1L16 |
| 0000003 | 00078723 | 0034 | PQ01-83 | 2L05 |

FIG. 8

| Operation Mode | Temperature Difference ΔT | Preset Temperature Reaching Time Δt | Compressor Rotational Frequency |
|---|---|---|---|
| Cooling | 2.3 | 6.0 | 2000 |
| Cooling | 5.0 | 10.7 | 2210 |
| Cooling | 3.2 | 6.8 | 2033 |
| Cooling | 3.3 | 6.9 | 2008 |
| Heating | 3.5 | 3.7 | 2039 |
| Heating | 5.5 | 5.0 | 2157 |
| Heating | 3.0 | 3.5 | 2001 |
| Heating | 2.0 | 3.0 | 1899 |
| Heating | 2.2 | 3.0 | 1948 |
| Heating | 3.6 | 3.7 | 2030 |
| Heating | 4.8 | 4.5 | 2074 |
| Heating | 2.5 | 2.9 | 1975 |

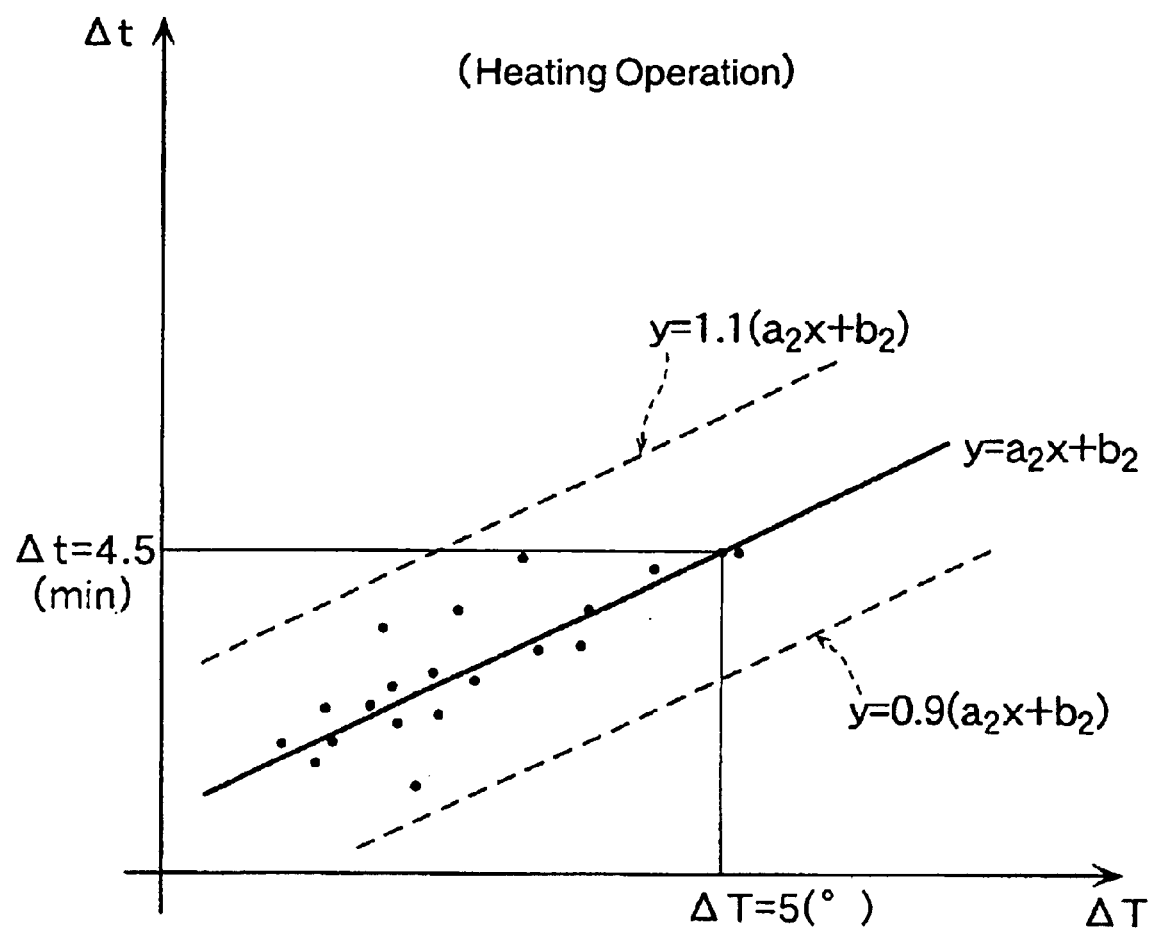

REMOTE MAINTENANCE SYSTEM

BACKGROUND OF THE INVENTION (1) Field of the Invention

The present invention relates to a remote maintenance system that makes an automatic failure diagnosis of electrical appliances for family use using a communication line, and transmits failure information to a service management center.

(2) Description of the Prior Art

A conventional remote maintenance system that detects malfunction of an electrical appliance located in each house quickly and correctly, and automatically reports it to a service center which provides maintenance services of the electrical appliance has been developed. In this type of remote maintenance system, a home server is located in each house under a maintenance contract of the electrical appliance with the service center, and the home server is connected to a center server which is located in the service center via a communication network. Each electrical appliance includes a monitor circuit for monitoring an internal state of itself, and reports the monitored internal state to the home server connected to the appliance via a LAN (Local Area Network) or the like. The home server sends the internal state reported by each electrical appliance to the center server via the communication line or the like. The center server holds per model of the appliance a failure decision model (hereinafter referred to as "a failure model") that is data indicating a reference value of normal operation in each part of the appliance, and decides whether the difference between each status value indicating the internal state of the applicable model received from the home server and the reference value indicated in the failure model is within a range of normal operation or not. As a result of the decision, when it is decided that there is a failure because the status value is beyond the normal range, the center server displays an instruction of dispatching a serviceman who is in charge of maintenance of the electrical appliance to the house which sent the status value.

As mentioned above, since the center server receives in advance the internal state of each part of each electrical appliance from the home server, it is possible to find easily a bad area of the appliance, and specify and prepare easily a replacement part, etc. for repair. As a result, a serviceman is not required for an advanced diagnosis, needs not carry unnecessary parts, and therefore can quickly repair the appliance.

However, there is a disadvantage that a load on the center server becomes heavy when the center server makes failure decisions of many kinds of electrical appliances located in each house in a centralized manner. On the other hand, if the home server of each house makes these failure decisions, the load on the center server can be reduced. In other words, if the home server of each house holds a failure model corresponding to all models of the electrical appliances located there, it can make this failure decision.

However, there is a problem in the conventional failure model, which is configured basically based on fixed reference values. That is, when the state of the appliance varies from the initial state due to secular changes or usage environment of each house, it becomes difficult for the home server to make an accurate failure decision, and it may decide that an apparatus has failed during normal operation or decide that the appliance is normal in spite of a failure, for example. Further, conventionally, when an electrical appliance goes wrong, the same information is displayed on both a display of a home server for a customer and a display of a center server for a serviceman. Although the information such as a part name inside the appliance, a name of a replacement part for repair, a product number code, a failure code, etc. is very useful for the serviceman who is going to repair the electrical appliance, display of such unfamiliar information is meaningless and inconvenient for the customer.

SUMMARY OF THE INVENTION

Accordingly, the object of the present invention is to provide a remote maintenance system that can make a failure diagnosis in touch with actual conditions such as usage environment of each electrical appliance by holding a latest failure model in a home server all the time. Also, the second object of the present invention is to display failure information of the appliance in a manner corresponding to a viewer's needs.

In order to achieve the above-mentioned object, the remote maintenance system according to the present invention includes a center server that is located in a service center for performing maintenance of an electrical appliance and a home server that is located in each house and monitors a status of an electrical appliance in a house, wherein the center server and the home server are connected via a communication line. The home server includes: a status value acquiring unit operable to acquire a status value of each electrical appliance; a failure model receiving unit operable to receive from the center server a failure model which is information defining a method for deriving a decision whether the electrical appliance has failed or not from the status value; and a failure deciding unit operable to decide whether the electrical appliance has failed or not based on the acquired status value and the received failure model using qualitative reasoning, and the center server includes a failure model updating unit operable to update the failure model and send the updated failure model to the home server.

As mentioned above, in the home server of the remote maintenance system of the present invention, the failure model receiving unit receives a failure model from the center server, and the failure deciding unit decides whether the electrical appliance has failed or not based on the status value acquired from each electrical appliance and the received failure model. Also, in the center server, the failure model updating unit updates the failure model and sends the updated failure model to the home server.

In other words, the home server in the remote maintenance system of the present invention decides whether an electrical appliance has failed or not using the latest failure model updated in the center server. As a result, there is an effect that the home server can make a failure diagnosis in touch with the actual conditions of each electrical appliance, such as secular changes and usage environments, because the center server updates the failure model based on the status information of the electrical appliance which has been collected from each house.

Also, in order to achieve the second object, the home server in the remote maintenance system, according to the present invention, further includes a customer display unit operable to display failure information of the electrical appliance, the failure deciding unit sends information specifying contents of a failure of the electrical appliance to the center server when the failure deciding unit decides that the electrical appliance has failed, and the center server further includes: a holding unit operable to hold different contents of failure information which are prepared beforehand for a customer and a serviceman separately corresponding to a failure which can occur per model of the electrical appliance; a failure information sending unit operable to receive information specifying contents of a failure of the electrical appliance, specify failure information for a customer among the information held in the holding unit, and send the specified failure information to the home server; and a serviceman display unit operable to receive information specifying contents of a failure of the electrical appliance, specify failure information for a serviceman among the information held in the holding unit, and display the specified failure information for a serviceman.

Therefore, according to the remote maintenance system of the present invention, different contents of failure information can be displayed on the customer display unit in the home server and the serviceman display unit in the center server. In other words, on the customer display unit, failure and repair information can be displayed in a plain expression for a customer instead of technical and detailed information about an electrical appliance and the repair which seems to be unnecessary to the customer. As a result, referring to the customer display unit can prevent a wrong action of the customer when he/she finds trouble with the electrical appliance. Further, since technical, on-target and more detailed repair information can be displayed on the serviceman display unit for a serviceman, there is an effect that he/she can take appropriate measures against a failure of the electrical appliance efficiently and quickly even without any special repair skill or experience.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 3 is a diagram showing a data structure of a customer list stored in a customer list database.

FIG. 4 is a diagram showing a data structure of an appliance list stored in an appliance list database.

FIG. 8 is a diagram showing a part of a data list which is generated by a failure model updating unit as shown in FIG. 1.

FIG. 10 is a graph showing a normal range of a time for reaching a preset temperature corresponding to a temperature difference during heating operation of an air conditioner with an appliance ID "000001".

DESCRIPTION OF THE PREFERRED EMBODIMENT(S)

Figure 1:
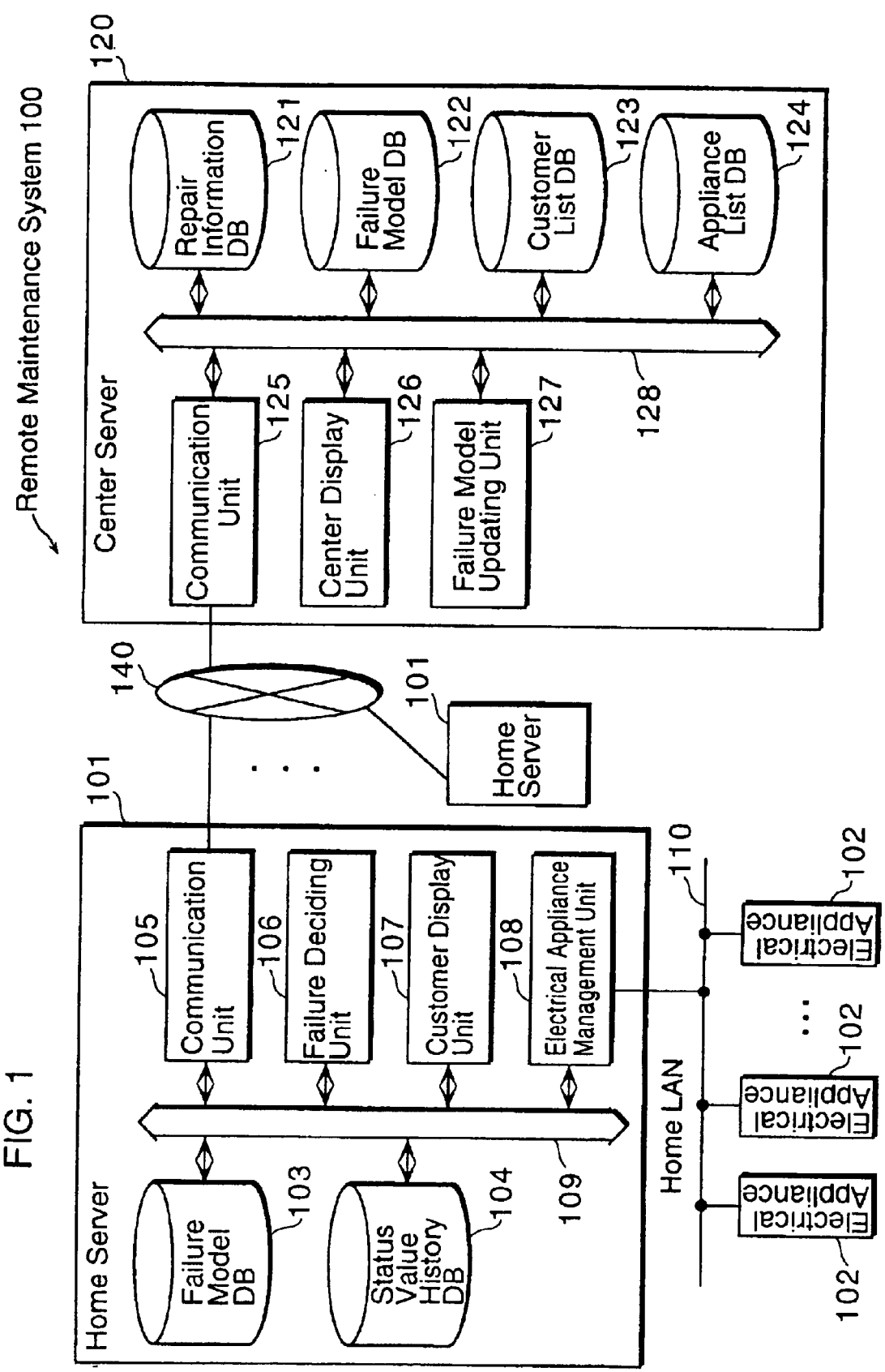
FIG. 1 is a block diagram showing a configuration of a remote maintenance system of the present embodiment.

The following is an explanation of the embodiment for the present invention with reference to FIGS. 1~11B. FIG. 1 is a block diagram showing a configuration of a remote maintenance system 100 of the present embodiment. The remote maintenance system 100 is a system in which a home server in a house diagnoses a failure of an electrical appliance located in each house based on a failure model, displays repair information for the failure to a user, stores status values of the appliance up to the time of the failure occurrence, and sends them to a center server, and the center server displays details of repair for the failure to a serviceman, updates a failure model based on the status values in normal operation, and sends the updated failure model to the home server. The remote maintenance system 100 includes a plurality of home servers 101 and a center server 120. Each of the home servers 101 is connected to the center server 120 respectively via a communication network 140.

The home server 101, which is located in each house, is a server that detects a failure of an electrical appliance 102 subject to remote maintenance which is connected to the home server 101 via a home LAN 110, and notifies the center server 120 of the failure. The home server 101 includes a failure model database (hereinafter referred to as "DB") 103, status value history DB 104, a communication unit 105, a failure deciding unit 106, a customer display unit 107, an electrical appliance management unit 108 and a bus 109. Each of these elements of the home server 101 communicates data to each other via the bus 109.

The electrical appliance 102 subject to remote maintenance is an air conditioner, a refrigerator, a television, a video, a washing machine, a light or the like, for example, and includes a monitor circuit which is not shown in this figure for monitoring a state of each part inside the electrical appliance 102. A design of the monitor circuit and data content monitored by this monitor circuit depend upon a model of the electrical appliance 102. When the electrical appliance 102 is an air conditioner or a refrigerator, the monitor circuit monitors a rotational frequency of a compressor, a temperature of a room or in the refrigerator, a lapsed time for reaching a preset temperature and others, and outputs the monitored status values in response to a request of the electrical appliance management unit 108. The monitor circuit may monitor a voltage value, a current value, a resistance value, an exothermic temperature and others in a specific circuit in the electrical appliance 102 in addition to the above data.

The failure model DB 103 holds a failure model which was sent from the center server 120 for each electrical appliance 102. The status value history DB 104 stores, per electrical appliance 102, status values in normal operation which the electrical appliance management unit 108 acquired from each electrical appliance 102. These status values are held in combination with an operational condition value of the electrical appliance 102 at the time of acquiring the status values. The operational condition value indicates a transient state or a steady state of the electrical appliance 102. The transient state is, in a case of an air conditioner, for example, an operational state up to the actual room temperature reaches a preset temperature, and the steady state is an operational state after the actual room temperature has reached the preset temperature. Under the transient state, the air conditioner operates to heat or cool the room atmosphere (heating or cooling operation) in order to eliminate a difference between the room temperature and the preset temperature. On the contrary, under the steady state, the air conditioner operates to keep the room temperature at the preset temperature after the room temperature has once reached the preset one. Therefore, the load put on a compressor or the like under the steady state is lighter than that under the transient state. As mentioned above, since it is obvious that a status value greatly depends upon an operational state, it is necessary to decide the status value corresponding to an operational condition in order to decide a failure correctly. Note that, although two cases of the operational conditions, that is, the transient state and the steady state, are described here, the number of the operational conditions is not limited to two because there are, in fact, a lot of multifunctional electrical appliances 102 having various operational modes. A power saving mode in an air conditioner, for example, can be conceived, for reducing electric power consumption of cooling/heating operation late at night to 80 or 90% of that in full operation. In this case, since there are two modes with different status values even in the same transient state, three operational conditions should be made.

The communication unit 105 is a processing unit that sends various kinds of requests of the home server 101 to the center server 120 via the communication network 140, and receives a failure model and customer repair information from the center server 120. Specifically, the communication unit 105 sends an appliance list adding request to the center server 120 when the electrical appliance management unit 108 detects an electrical appliance 102 which was newly connected to the home LAN 110, and sends a failure model sending request corresponding to the electrical appliance 102 when the appliance list adding request is normally completed. Next, it receives the failure model from the center server 120, and transfers it to the failure deciding unit 106. Further, when the failure deciding unit 106 decides a failure of the electrical appliance 102, the communication unit 105 receives a repair information sending request for requesting sending of the repair information, that is the contents of the failure, which is to be displayed on the customer display unit 107 from the failure deciding unit 106, and sends it to the center server 120. Failure combination information that is a combination of an operational condition value and a status value on failure, an appliance ID 202 for identifying a failed electrical appliance 102, a customer ID 301 for identifying a customer of the home server 101 and others are attached to the repair information sending request. Next, the communication unit 105 sends normal operation combination information that is a combination of operational condition values and status values under normal operation which have been stored in the status value history DB 104 to the center server 120. Further, in response to this, the communication unit 105 receives customer repair information and the updated failure model from the center server 120, and transfers them to the customer display unit 107 and the failure deciding unit 106, respectively, The failure deciding unit 106 is a processing unit that diagnoses a failure of the electrical appliance 102 connected to the home LAN 110 based on qualitative reasoning. Specifically, based on a combination of operational condition values and status values acquired from each electrical appliance 102 and a failure model indicating an arithmetic processing and a comparative decision processing of the acquired status values, the failure deciding unit 106, performs an arithmetic processing for each acquired status value, and decides that there is a failure of the electrical appliance 102 by comparing the arithmetic result with a standard value. The customer display unit 107, which is realized by a liquid-crystal panel or the like. Included in the main body of the home server 101, displays repair information prepared for a customer. The electrical appliance management unit 108, which holds information on the electrical appliance 102 connected to the home LAN 110, reads in a failure model in the failure model DB 103. regularly, detects an electrical appliance 102 which was newly connected to the home LAN 110, and sends the appliance information acquired from the new electrical appliance 102 to the communication unit 105. The appliance information includes data identifying the electrical appliance 102, such as an appliance ID, a manufacturer code, a model code, a connection point. The bus 109, which is a transmission path for transmitting data in the home server 101 in parallel, transmits data at a high speed among processing units in the home server 101. The home LAN 110, which is a data transmission path for transmitting data, such as appliance information, operational condition values, and status values of each electrical appliance 102 connected to the home LAN 110, superimposes the above-mentioned data and transmits it to an AC power supply flowing through a light line when the light line in a house is used. Note that the light line needs not always be used for the home LAN 110.

The center server 102 located in the service center updates a failure model of the electrical appliance 102, when the electrical appliance 102 in each house failed, based on normal operation combination information of the electrical appliance 102 which is sent from the home server 101, and sends back the updated failure model and the customer repair information on the failure to the home server 101. This center server 102 also displays serviceman repair information indicating details of the failure. The center server 102 is a server which is realized by a computer system or the like, and it includes roughly four memory devices which are realized by hard disks or the like (repair information DB 121, failure model DB 122, customer list DB 123 and appliance list DB 124), three processing units which are realized by CPUs or the like (a communication unit 125, a center display unit 126 and a failure model updating unit 127), and a bus 128. Each of the above devices and units of the center server 120 communicates data to each other via the bus 128.

The repair information DB 121 holds the customer repair information prepared for displaying to a customer and the serviceman repair information prepared for displaying to a serviceman details of the failure of the electrical appliance 102 corresponding to a type of the electrical appliance 102 and the failure. The failure model DB 122 holds a failure model of an initial setting per model of the electrical appliance 102 which can be subject to maintenance by the remote maintenance system 100. The customer list DB 123 holds personal information including an address, name, phone number, etc. of the customer who has a maintenance service contract with the service center of the remote maintenance system 100. The appliance list DB 124 holds information of the electrical appliance 102 per customer or per electrical appliance 102, which is used in the house of the customer who makes a maintenance service contract with the service center of the remote maintenance system 100 and is now subject to maintenance.

The communication unit 125 is a processing unit that receives various requests and combination information from the home server 101 via the communication network 140 and transfers them to the failure model updating unit 127, and then sends the processing result of the failure model updating unit 127 to the home server 101. Specifically, the communication unit 125 receives an appliance list adding request from the home server 101 and transfers it to the failure model updating unit 127. When it receives, in response to this, a notice of a normal termination or an abnormal termination of the appliance list adding request from the failure model updating unit 127, it sends back the notice to the home server 101. When it sends the notice of the normal termination, it further receives a failure model sending request from the home server 101 and transfers it to the failure model updating unit 127. Then, it sends to the home server 101 a failure model which was read out from the failure model DB 122 by the failure model updating unit 127. The communication unit 125 receives, from the home server 101 that detected the failure of the electrical appliance 102, a repair information sending request, failure combination information and normal operation combination information of the electrical appliance 102, and transfers them to the failure model updating unit 127. The communication unit 125 sends the customer repair information which was read out from the repair information DB 121 by the failure model updating unit 127 to the home server 101. Further, the communication unit 125 sends to the failure model updating unit 127 the normal operation combination information of the electrical appliance 102 which was received from the home server 101, and sends the failure model which was updated in the failure model updating unit 127 based on the normal operation combination information to the home server 101.

The center display unit 126 is a monitor device of the center server 120 which is realized by a liquid crystal display panel, a CRT or the like. It displays for a serviceman who is responsible for a repair the serviceman repair information which was read out from the repair information DB 121 by the failure model updating unit 127. The failure model updating unit 127 is a processing unit that manages data stored in each DB 121~124 of the center server 120, and updates a failure model based on normal operation combination information of the electrical appliance 102 which was received from the home server 101. Specifically, the failure model updating unit 127 reads out a failure model from the failure model DB 122 in response to a failure model sending request from the home server 101, and sends it back to the home server 101. Also, the failure model updating unit 127 reads out customer repair information and serviceman repair information from the repair information DB 121 based on the received failure combination information in response to a repair information sending request from the home server 101, generates a data list based on the received normal operation combination information, and updates (the standard value of) the failure model of the electrical appliance 102 based on the generated data list by a vector quantization method. Note that, since the failure model updating unit 127 updates only the standard value of the failure model here, only the standard value of the updated failure model may be sent. The bus 128, which is a parallel data transmission path for connecting each processing unit in the center server 120, transmits data between each unit at a high speed.

Figure 2:
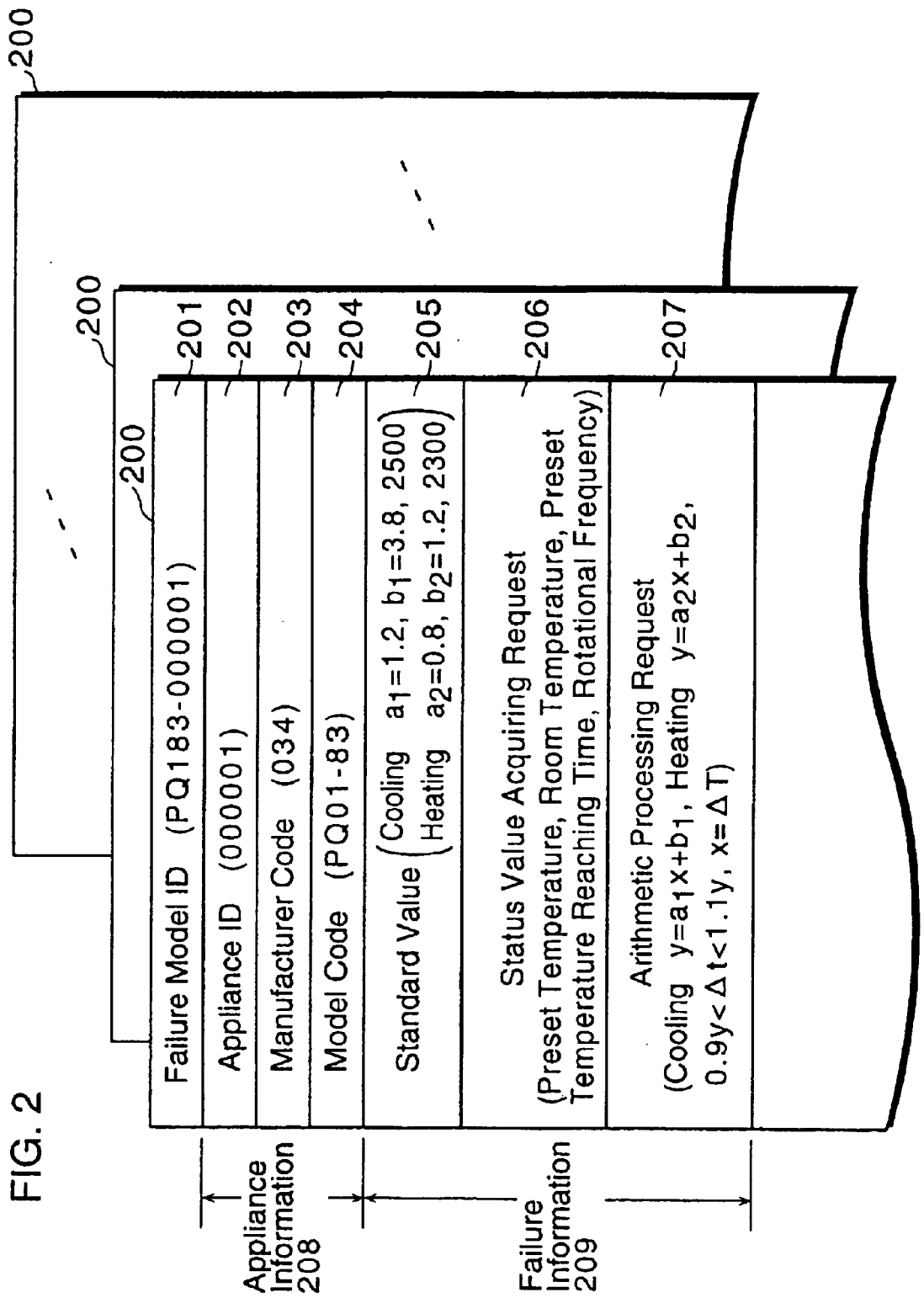
FIG. 2 is a diagram showing a data structure of a failure model stored in a failure model database.

FIG. 2 is a diagram showing a data structure of a failure model 200 stored in a failure model DB 103. The failure model 200 is data including various parameters and programs which are the criteria for diagnosing a failure of each electrical appliance 102, and according to these programs, the electrical appliance management unit 108 acquires status values based on a status value acquiring request from the electrical appliance 102, and the failure deciding unit 106 makes a calculation of the status values such as multiplication/division, addition/subtraction, integration/differentiation or a functional operation based on an arithmetic processing request and diagnoses a failure of the electrical appliance 102 based on the calculation result and the standard value. The failure model 200 roughly includes items such as a failure model ID 201, appliance information 208 and failure information 209. An ID that uniquely identifies each failure model 200, for example, "PQ183-000001" is recorded in the item of the failure model ID 201. The appliance information 208 includes an appliance ID 202, a manufacturer code 203 and a model code 204. An appliance ID that identifies the electrical appliance 102 related with the failure model 200, for example, "000001" is recorded in the appliance ID 202. A code of a manufacturer of the electrical appliance 102 identified by the appliance ID 202, for example, "034" is recorded in the manufacturer code 203. A code that identifies a model of the electrical appliance 102, for example, "PQ01-83" is recorded in the model code 204.

The failure information 209 includes a standard value 205, a status value acquiring request 206 and an arithmetic processing request 207. Parameters such as a coefficient and constant of a function for specifying a range of normal state of each electrical appliance 102 are recorded in the standard value 205. Here, "cooling, a1=1.2, b1=3.8, 2500/heating, a2=0.8, b2=1.2, 2300", for example, is recorded. This means that, when it is decided whether the electrical appliance 102 is normal or not based on a status value indicating a time for reaching a preset temperature under cooling operation, a range of normal state is determined by assigning "1.2" and "3.8" to a1 and b1 of the arithmetic expression, and when it is decided based on a status value indicating a rotational frequency of a compressor under cooling operation, the highest value should be "2500 rpm". Similarly, when it is decided whether the electrical appliance 102 is normal or not based on a status value indicating a time for reaching a preset temperature under heating operation, a range of normal state is determined by assigning "0.8" and "1.2" to a2 and b2 of the arithmetic expression, and when it is decided based on a status value indicating a rotational frequency of a compressor under heating operation, the highest value should be "2300 rpm". A program for having the electrical appliance management unit 108 acquire status values from the applicable electrical appliance 102 and details of the status values which the electrical appliance management unit 108 should acquire are recorded in the status value acquiring request 206. This program includes timing when the electrical appliance management unit 108 acquires the status values from a monitor circuit of the electrical appliance 102 and processing for reading an operational condition value when it acquires the status values. The timing of acquiring the status values from the monitor circuit, every 1 minute or 30 seconds from switch-on of the electrical appliance 102, for example, is set depending upon a type and a function of the electrical appliance 102. Also, the status values which should be acquired are "a preset temperature, a room temperature, a preset temperature reaching time, a rotational frequency of a compressor," etc., for example. An arithmetic program for performing the arithmetic operation using the acquired status values when the failure deciding unit 106 diagnoses a failure of the applicable electrical appliance 102 is recorded in the arithmetic processing request 207. Here, "cooling, y=a1x+b1, heating, y=a2x+b2, 0.9y<Δt<1.1y, x=ΔT", for example, is recorded. This means that, in a case of x=ΔT, when it is decided whether the electrical appliance 102 is normal or not based on the preset temperature reaching time under cooling operation, an arithmetic expression y=a1x+b1 is used, and when it is decided under heating operation, an arithmetic expression y=a2x+b2 is used, and the normal ranges of respective preset temperature reaching times are to be 0.9 y<Δt<1.1y. Although the initial value of the failure model 200 is common to each model of the electrical appliance 102, parameters and others which have been recorded in the failure information 209 are updated based on the combination information during the normal operation of the applicable electrical appliance 102, every time a failure of the electrical appliance 102 is decided, and therefore the failure model 200 becomes specific to the electrical appliance 102.

FIG. 3 is a diagram showing a data structure of a customer list 300 stored in a customer list DB 123. The customer list 300 is a list that contains personal information of the customers who have maintenance contracts of the electrical appliances 102 with the service center of the remote maintenance system 100. The personal information of each customer includes, for example, a customer ID 301, name 302, postal code 303, address 304, phone number 305, floor plan 306 and others. The customer ID 301 is an ID assigned to a customer when he/she has a maintenance contract with the service center, and the center server 120 can identify the customer uniquely with this customer ID 301. There is accordingly an effect that the center server 120 can identify the address indicating the location of the electrical appliance 102 which should be repaired based on the customer ID, the name and the phone number of the customer and display them for a serviceman for the repair. A customer's name is recorded in the name 302, a postal code of the customer's address in the postal code 303, his/her address in the address 304, and a phone number in the phone number 305, respectively. Also, in the floor plan 306, a file name of the floor plan which is prepared as an image file and stored in another memory area in the customer list DB 123 is recorded. For example, it is found that the name 302 of the customer who is managed by the customer ID 301 "00078723" among the above personal information is "Katsue Isono", her address 304 and its postal code 303 are "〒 123-4567 Kadomatsu-cho 1-1, Kadomatsu-shi", her phone number 305 is "06-6378-5678", and the file names of the floor plan of her house located in the above address 304 "Kadomatsu-cho 1-1, Kadomatsu-shi" are "00078723m1" for the first floor and "00078723m2" for the second floor.

FIG. 4 is a diagram showing a data structure of an appliance list 400 stored in an appliance list DB 124. The appliance list 400 is a list that contains information concerning the electrical appliances 102 subject to maintenance of the service center. The information of each electrical appliance 102 includes an appliance ID 202, a customer ID 301, a manufacturer code 203, a model code 204, a connection point 401 and others. Since the appliance ID 202, the customer ID 301, the manufacturer code 203 and the model code 204 have already been described above, only the connection point 401 is explained here. A code indicating a location of a connection outlet is recorded in the connection point 401. This location of a connection outlet is indicated in an image of the image file, whose name is stored in the floor plan 306 of the customer list 300. The connection point 401 "1K01" indicates the location of the connection outlet "01" in the kitchen on the first floor of "Katsue Isono"'s house. Also, the connection point 401 "2L05" indicates the location of the connection outlet "05" in the living room on the second floor of "Katsue Isono"'s house. There is accordingly an effect that a serviceman can go straight to the electrical appliance 102 which should be repaired without missing the way by referring to the floor plan 306 of the customer list 300 and this code of the connection point 401, even if a plurality of electrical appliances 102 of an identical model are connected in one house.

Figure 5:
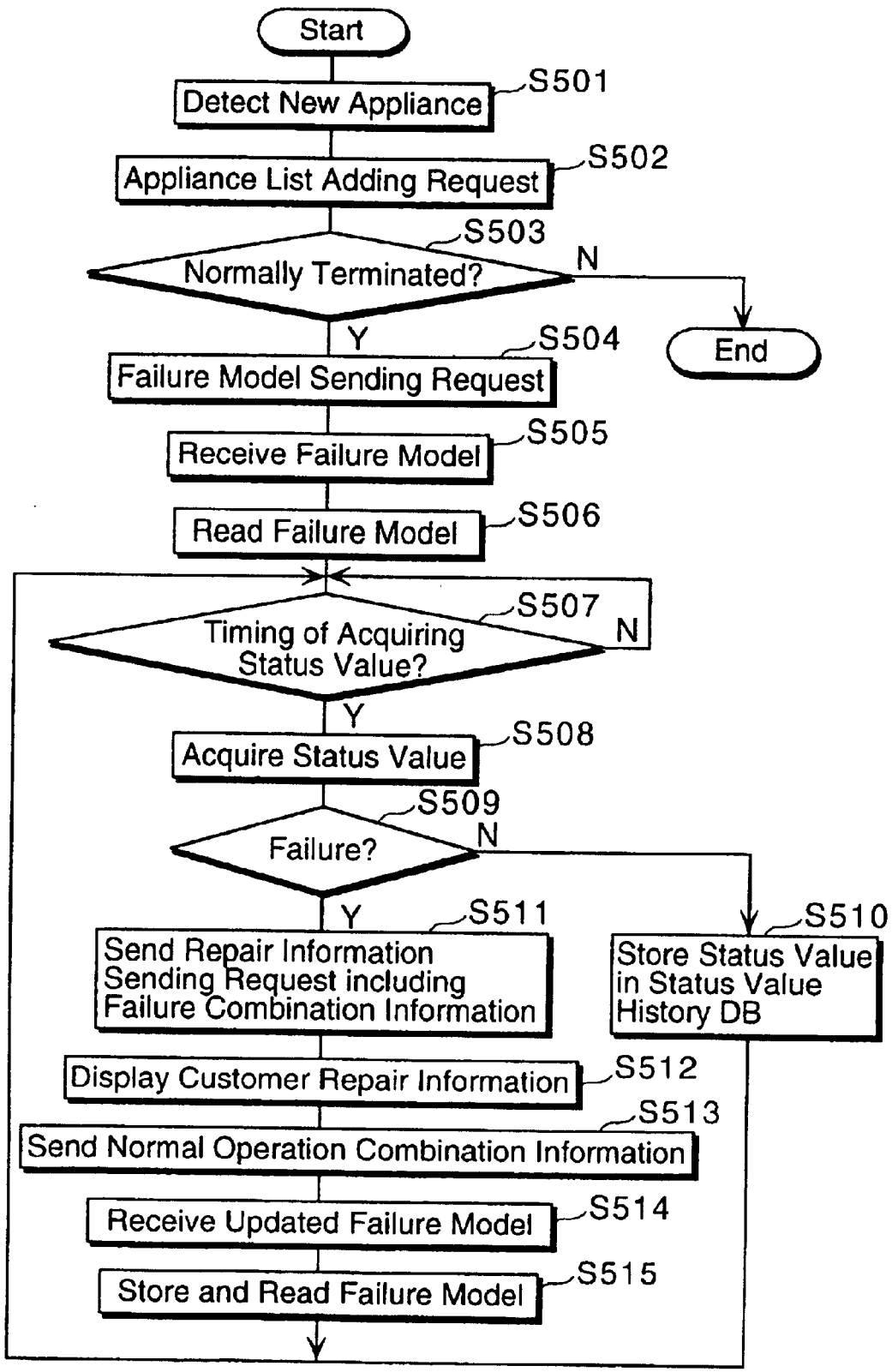
FIG. 5 is a flowchart showing operations for a new electrical appliance in a home server as shown in FIG. 1.

Next, operations of the remote maintenance system 100 that is configured above will be explained below. FIG. 5 is a flowchart showing operations for a new electrical appliance 102 in the home server 101 as shown in FIG. 1.

The electrical appliance management unit 108 of the home server 101 detects the electrical appliance 102 which was newly connected to the home LAN 110 (S501), and sends an appliance list adding request to the failure model updating unit 127 of the center server 120 every time it detects a new electrical appliance 102 (S502). The home server 101 judges whether the processing of the center server 120 in response to the appliance list adding request terminated normally or not according to the notice from the center server 120 (S503). When the processing terminated abnormally, the home server 101 terminates the processing for the electrical appliance 102 which was newly detected, and when the processing terminated normally, it sends a failure model sending request to the center server 120 (S504).

The home server 101 receives a failure model corresponding to the new electrical appliance 102 from the center server 120 (S505), reads in the received failure model (S506), stands by until the timing of acquiring status values according to the status value acquiring request 206 of the read-in failure model (507), and acquires the status value from the new electrical appliance 102 at the timing of acquiring the status value (S508). The failure deciding unit 106 of the home server 101 diagnoses a failure of the newly detected electrical appliance 102 based on the acquired status value (S509). Specifically, the failure decision 106 transfers a status value acquiring request 206 included in the failure model to the electrical appliance management unit 108, and the electrical appliance management unit 108 receives items requested by the status value acquiring request 206 in the failure model as status values from the new electrical appliance 102. The electrical appliance management unit 108 transfers the status values received from the electrical appliance 102 to the failure deciding unit 106. The failure deciding unit 106 makes a failure decision of the electrical appliance 102 based on the failure model received from the communication unit 105 and the status values received from the electrical appliance management unit 108.

When there is no failure as a result of the diagnosis, the failure deciding unit 106 stores the status values in the status value history DB 104 (S510). When there is a failure as a result of the diagnosis, the failure deciding unit 106 sends a repair information sending request including information concerning the failure as attached data, that is, a customer ID 301, an appliance ID 202, information indicating the failure such as an abnormal code for identifying details of the failure, and the failure combination information of the electrical appliance 102, to the repair information DB 121 of the center server 120 (S511). The home server 101 displays, in response to this, the received customer repair information on the customer display unit 107 (S512), and then, the failure deciding unit 106 reads out the normal operation combination information from the status value history DB 104, and sends the read-out combination information to the failure model updating unit 127 of the center server 120 (S513). Further, the communication unit 105 of the home server 101 receives the updated failure model from the center server 120 (S514), overwrites the existing failure model in the failure model DB 103 with the received failure model and stores it, and the electrical appliance management unit 108 reads the received failure model (S515). Then, the home server 101 repeats the above, that is, standing by until the timing of acquiring the status values according to the read-in status value acquiring request 206, acquiring the status values of the electrical appliance 102 at the timing of acquiring the status values indicated by the status value acquiring request 206, making a failure decision every time it acquires the status values and performing the processing according to the decision result (S507~S515).

Figure 6:
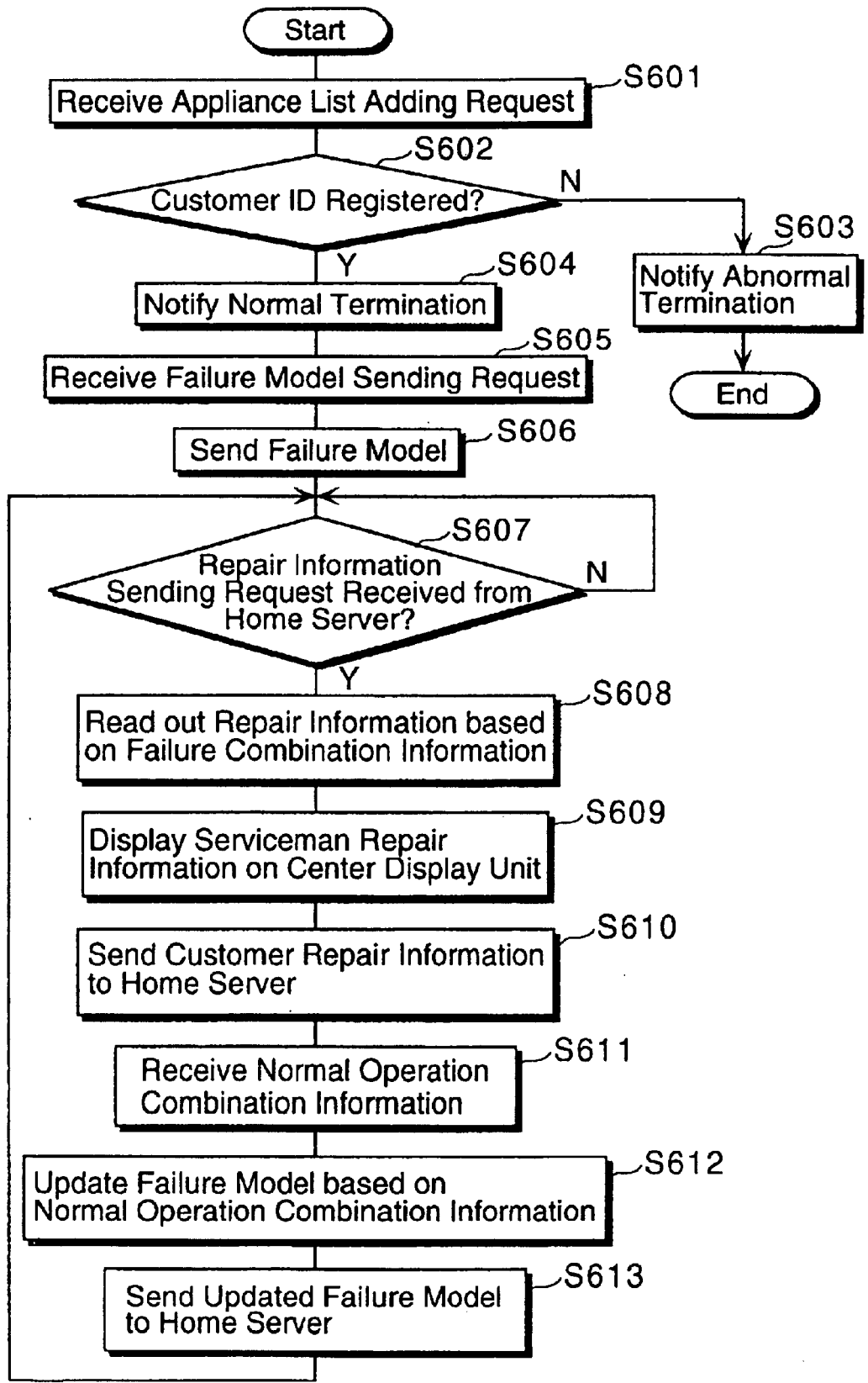
FIG. 6 is a flowchart of a center server in response to operations for a new electrical appliance in a home server as shown in FIG. 5.

FIG. 6 is a flowchart showing operations of the center server 120 in response to the operations for the new electrical appliance 102 in the home server 101 as shown in FIG. 5. When the failure model updating unit 127 of the center server 120 receives an appliance list adding request from the home server 101 (S601), it checks whether or not the customer ID 301 of the user of the electrical appliance 102 concerning the appliance list adding request is registered in the customer list 300 stored in the customer list DB 123 (S602). When the customer ID 301 is not registered, it does not add the new electrical appliance 102 to the appliance list 400 as being not subject to a failure diagnosis. In this case, the center server 120 notifies the home server 101 that the appliance list adding request was terminated abnormally (S603), and terminates the processing corresponding to the electrical appliance 102. When the customer ID 301 is registered in the customer list 300, the failure model updating unit 127 additionally registers the information of the new electrical appliance 102 in the appliance list 400, and notifies the home server 101 that the appliance list adding request was terminated normally (S604). On the other hand, the center server 120 which received a failure model sending request from the home server 101 (S605) reads out a failure model corresponding to the new electrical appliance 102 from the failure model DB 122 and sends it to the home server 101 (S606).

Then, the center server 120 stands by until the communication unit 125 receives a repair information sending request to which the failure combination information of the electrical appliance 102 is attached from the home server 101 (S607), and when it receives the repair information sending request, the center server 102 reads out customer repair information and serviceman repair information corresponding to the attached failure combination information from the repair information DB 121 (S608). The center display unit 126 displays the serviceman repair information read out on the bus 128 (S609), and the communication unit 125 sends the read-out customer repair information to the home server 101 (S610).

When the center server 120 receives the normal operation combination information of the electrical appliance 102 from the home server 101 (S611), it updates the failure model based on the received normal operation combination information (S612), and sends the updated failure model to the home server 101 (S613). Then, the center server 120 returns to the stand-by state until the communication unit 125 receives the repair information sending request again, and performs the processing corresponding to the repair information sending request when it is received (S607~S613).

Figure 7:
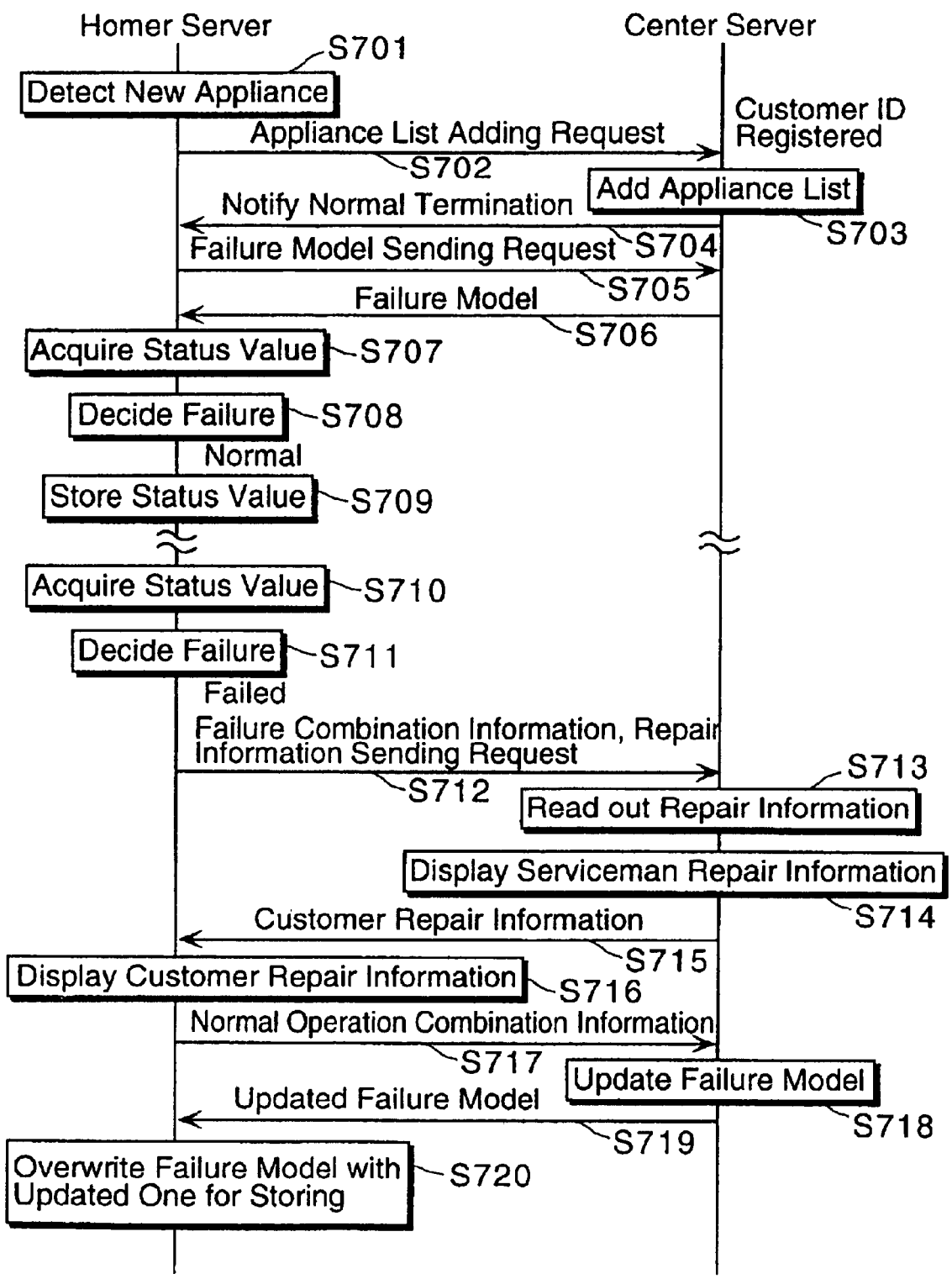
FIG. 7 is a diagram of a communication sequence showing a communication procedure between a home server and a center server as shown in FIG. 5 and FIG. 6.

FIG. 7 is a diagram of a communication sequence showing a communication procedure between the home server 101 and the center server 120 as shown in FIG. 5 and FIG. 6. When the home server 101 detects a new electrical appliance 102 (S701, S501 in FIG. 5), it sends an appliance list adding. request to the center server 120 (S702, S502 in FIG. 5). When the customer of the home server 101 which sent the appliance list adding request has already been registered, the center server 120 additionally registers the electrical appliance 102 to the appliance list DB 124 (S703), and notifies the home server 101 that the appliance list adding processing was terminated normally (S704, S604 in FIG. 6). The home server 101 receives this notice, and sends a failure model sending request corresponding to the electrical appliance 102 to the center server 120 (S705, S504 in FIG. 5). The center server 120 reads out the requested failure model from the failure model DB 122, and sends it to the home server 101 which requested it (S706, S606 in FIG. 6).

The home server 101 reads out the status value acquiring request 206 from the received failure model, and acquires the status values indicated in the status value acquiring request 206 as well as the operational condition values at that time (S707, S508 in FIG. 5). The failure deciding unit 106 of the home server 101 decides whether there has been a failure of the electrical appliance 102 by comparing the acquired operational condition values and the status values with the range of the normal values indicated in the failure model (S708, S509 in FIG. 5), and stores the combination information of the acquired operational condition values and the status values in the status value. history DB 104 when the electrical appliance 102 is normal (S709, S510 in FIG. 5).

When the timing of acquiring the status values indicated in the status value acquiring request 206 is reached (S507 in FIG. 5), the home server 101 acquires status values and operational condition values of the electrical appliance 102 again (S710, S508 in FIG. 5), and makes a failure decision of the electrical appliance 102 (S711, S509 in FIG. 5). When the electrical appliance 102 is decided as having failed, the home server 101 sends a repair information sending request including the combination information of the electrical appliance 102 which has just been acquired to the center server 120 (S712, S511 in FIG. 5).

The center server 120 reads out the customer repair information and the serviceman repair information corresponding to the failure of the electrical appliance 102 from the repair information DB 121 based on the failure combination information included in the repair information sending request (S713, S608 in FIG. 6), displays the serviceman repair information on the center display unit 126 (S714, S609 in FIG. 6), and sends the customer repair information to the home server 101 (S715, S610 in FIG. 6). The home server 101 displays the received customer repair information on the customer display unit 107 (S716, S512 in FIG. 5), reads out the normal operation combination information of the electrical appliance 102 from the status value history DB 104 and sends it to the center server 120 (S717, S513 in FIG. 5). The center server 120 updates the corresponding failure model based on the normal operation combination information which was received from the home server 101 (S718, S612 in FIG. 6), and sends the updated failure model to lo the home server 101 (S719, S613 in FIG. 6). The home server 101 which received the updated failure model (S514 in FIG. 5) updates the failure model in the failure model DB 103 by overwriting the corresponding failure model in the failure model DB 103 with the updated failure model (S720, S515 in FIG. 5).

Detection of a new electrical appliance 102 in each house, collection of status values of the electrical appliance 102 and operations of each element in the remote maintenance system 100 on a failure decision have been explained. Failure model update processing performed by the failure model updating unit 127 of the center server 120 and failure diagnosis processing performed by the failure deciding unit 106 of the home server 101 will be explained below using a simple concrete example.

The failure model updating unit 127 of the center server 120 receives the normal operation combination information on the electrical appliance 102 from the home server 101, generates a data list based on the normal operation combination information, and updates a failure model stored in the failure model DB 122 by updating a standard value using data included in the data list. FIG. 8 is a diagram showing a part of a data list 800 which is generated by the failure model updating unit 127 as shown in FIG. 1. This data list 800 corresponds to the failure model 200 as shown in FIG. 2, and the target electrical appliance 102 is an air conditioner with an appliance ID 202 "000001". In each item of the data list 800, each status value of the air conditioner obtained according to the status value acquiring request 206 of the failure model 200 and the value obtained by arithmetic operation of the status value are recorded. Also, in the data list 800, appliance information 208 which is not shown in figures for identifying the target electrical appliance 102, combination information of other status values and operational conditions which are not shown in figures obtained by monitoring the electrical appliance 102 and others are recorded, but they are omitted here due to the complexity of diagramming them.

The data list 800 includes an operation mode 801, temperature difference ($\Delta T$) 802, preset temperature reaching time ($\Delta t$) 803, compressor rotational frequency 804 and others. The operation mode 801 distinguishes the data in each item on the same line between the data acquired during cooling operation and that acquired during heating operation. Although the data is indicated by "cooling" or "heating" here, it is actually indicated by a numeric value of an operational condition value which was acquired from the monitor circuit of the electrical appliance 102. That is because an operational state of each part of the air conditioner is different between during cooling operation and during heating operation, and therefore a range of normal operation is also different between them. Also, in the temperature difference 802, a temperature difference calculated based on an actually acquired room temperature and a preset temperature indicated in the status value acquiring request 206 of the failure model 200 is recorded. In the preset temperature reaching time 803, a time that the air conditioner requires for reaching a steady state from the setting of the preset temperature, that is, a time until the room temperature reaches the preset temperature, is recorded. Further, in the compressor rotational frequency 804, the maximum rotational frequency of the compressor for the period up to reaching the steady state of the air conditioner is recorded.

On the top line of the data list 800, status values which were acquired at a time according to the status value acquiring request 206 of the failure model 200 are indicated. When the temperature difference 802 between a preset temperature and a room temperature was "$\Delta T=2.3°$ C." during "cooling" operation as indicated in the operation mode 801, for example, it is found that it took "$\Delta t=6.0$ minutes" by the time when the room temperature reached the preset temperature and that the maximum of the compressor rotational frequency during the period up to reaching the preset temperature was "2000 rpm". When these values are assigned to the standard value 205 of the failure model 200 during cooling operation as shown in FIG. 2 "cooling, a1=1.2, b1=3.8, 2500", and the arithmetic processing request 207 of the failure model 200 "cooling, y=a1x+b1, heating, y=a2x+b2, 0.9y<$\Delta t$<1.1y, x=$\Delta T$", 0.9 y=0.9×((1.2× 2.3+3.8)=5.9 and 1.1 y=1.1×(1.2×2.3+3.8)=7.2 are found, and therefore 0.9y<6.0<1.1y is realized. In addition, since the compressor rotational frequency 804 "2000 rpm" satisfies the maximum rotational frequency during cooling operation "2500 rpm" or below indicated as the standard value 205 of the failure model 200, it is found that the air conditioner is under the normal operation.

Also, if you see the fifth line of the data list 800, it is found that, when the temperature difference 802 between a preset temperature and a room temperature was "$\Delta T=3.5°$ C." during "heating" operation as indicated in the operation mode 801, the preset temperature reaching time 803 was "$\Delta t=3.7$ minutes" and the compressor rotational frequency 804 was "2039 rpm". When these values are assigned to the standard value 205 of the failure model 200 during heating operation as shown in FIG. 2 "heating, a2=0.8, b2=1.2, 2300", and the arithmetic processing request 207 "cooling, y=a1x+b1, heating, y=a2x+b2, 0.9y<$\Delta t$<1.1y, x=$\Delta T$", 0.9y= 0.9×(0.8×3.5+1.2)=3.6 and 1.1y=1.1×(0.8×3.5+1.2)=4.4 are found, and therefore 0.9y<6.0<1.1y is realized. In addition, since the compressor rotational frequency 804 "2039 rpm" satisfies the maximum rotational frequency during heating operation "2300 rpm" or below indicated as the standard value 205, it is found that the air conditioner is under the normal operation.

Note that, although the data list 800 here includes the operation mode 801, temperature difference 802, preset temperature reaching time 803, compressor rotational frequency 804 and others because the target electrical appliance 102 is an air conditioner, the data list 800 includes quite different items from the above when the target electrical appliance 102 is a TV, an electric light, etc. These items are preset per model of the electrical appliance 102, and the status value acquiring request 206 of the failure model 200 is also preset corresponding to them.

Figure 9:
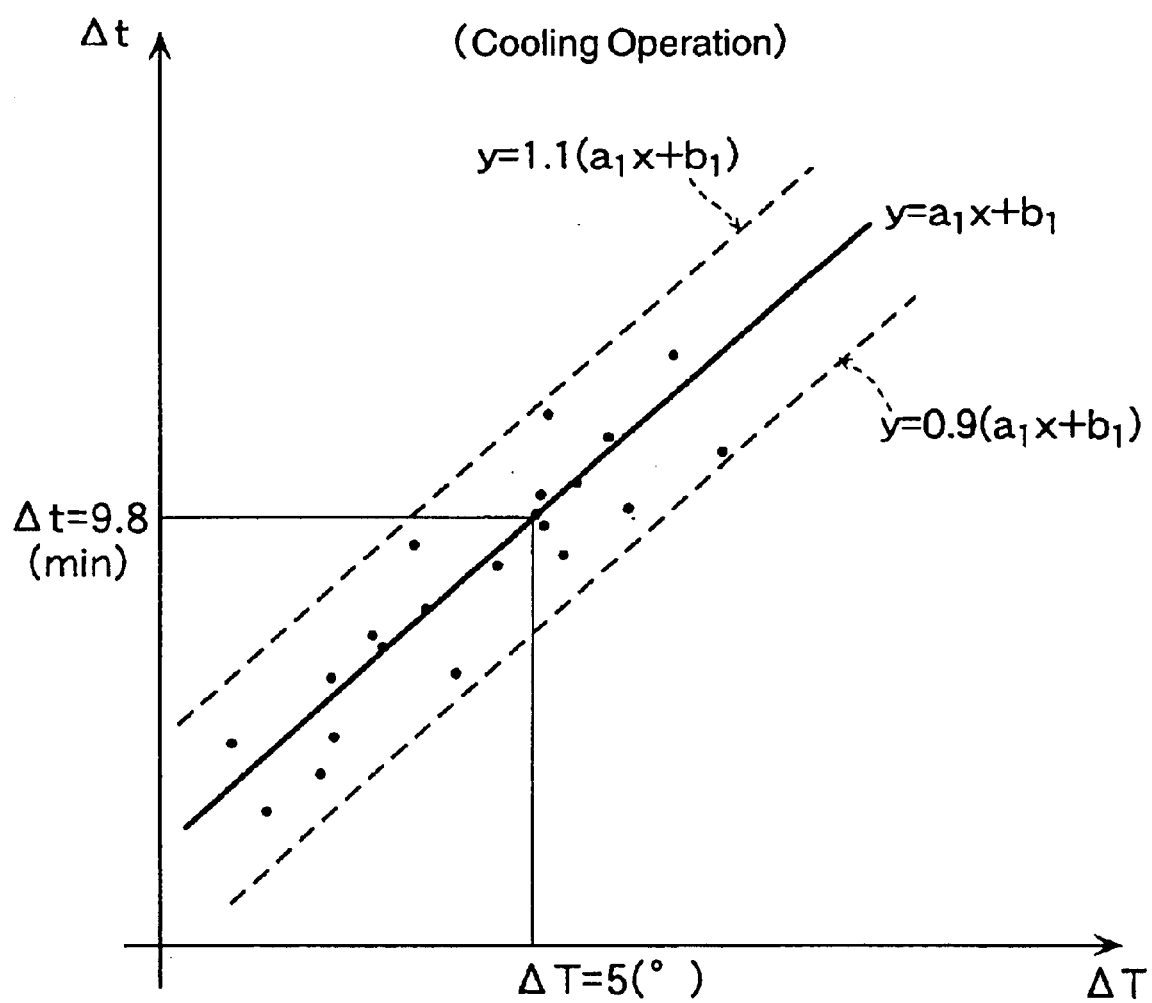
FIG. 9 is a graph showing a normal range of a time for reaching a preset temperature corresponding to a temperature difference during cooling operation of an air conditioner with an appliance ID "000001".

FIG. 9 is a graph showing a normal range of the preset temperature reaching time 803 corresponding to the temperature difference 802 during cooling operation of an air conditioner with an appliance ID 202 "000001". Coordinates as shown in FIG. 9 are indicated by the temperature difference ($\Delta T$) 802 as a horizontal axis and the preset temperature reaching time ($\Delta t$) 803 as a vertical axis. A straight line in FIG. 9 y=a1x+b1 indicates a standard for specifying a normal range of the preset temperature reaching time ($\Delta t$) 803 in the case of x=$\Delta T$. Values of coefficients a1 and b1 that uniquely determine the linear equation of the straight line are the values determined as the standard value 205 of the failure model 200. Therefore, when each of the status values of the temperature difference ($\Delta T$) 802 and the preset temperature reaching time ($\Delta t$) 803 during cooling operation of the air conditioner as shown in the data list 800 of FIG. 8 is plotted on the coordinate, it is plotted as shown in FIG. 9 within the range of y=0.9(a1x+b1) and y=1.1(a1x+ b1) indicated by a broken line. FIG. 10 is a graph showing a normal range of the preset temperature reaching time 803 corresponding to the temperature difference 802 during heating operation of the air conditioner with the appliance ID 202 "000001". Horizontal and vertical axes are same as those in FIG. 9. A straight line y=a2x+b2 indicates a standard for specifying a normal range of the preset temperature reaching time ($\Delta t$) 803 in the case of x=$\Delta T$, and values of coefficients a2 and b2 are the values determined in the standard value 205 of the failure model 200. Therefore, when each of the status values of the temperature difference (ΔT) 802 and the preset temperature reaching time (Δt) 803 during heating operation of the air conditioner as shown in the data list 800 of FIG. 8 is plotted on the coordinate, it is plotted within the range of y=0.9(a2x+b2) and y=1.1(a2x+b2) indicated by a broken line.

When the status values under the operational conditions recorded in the data list 800 in FIG. 8 are respective plots in FIG. 9 and FIG. 10, the failure model updating unit 127 of the center server 120 determines a straight line of which squaresof the distances from these plots are minimum by a vector quantization method, that is a least squares method here. That is, the failure model updating unit 127 determines the values of the coefficients a1, b1 under cooling operation in FIG. 9 and the coefficients a2, b2 under heating operation in FIG. 10 for uniquely specifying the linear equation of the straight line. The failure model updating unit 127 updates, with newly determined values, the values of the coefficients a1, b1 under cooling operation and the coefficients a2, b2 under heating operation which are determined in the standard value 205 of the failure model 200. In other words, the failure model updating unit 127 updates the failure model 200 with the updated coefficient values as new standard values of the failure model 200.

As mentioned above, the failure model updating unit 127 automatically updates the failure model 200 based on the normal operation combination information which was received from the electrical appliance 102 via the home server 101. There is accordingly an effect that the center server 120 sends the updated failure model 200 to the home server 101, and therefore the failure deciding unit 106 of the home server 101 can make an accurate failure decision in line with secular changes and usage environment of the electrical appliance 102 based on the updated failure model 200. Also, there is an effect that, when the failure model updating unit 127 of the center server 120 decides that the failure model 200 needs to be updated for all the electrical appliances 102 of the same model based on the normal operation combination information collected from the home server 101 of each house, it sends the updated failure model 200 to all the appliances of the applicable model registered in the appliance list 400, and therefore can update the failure model 200 easily.

Figure 11A:
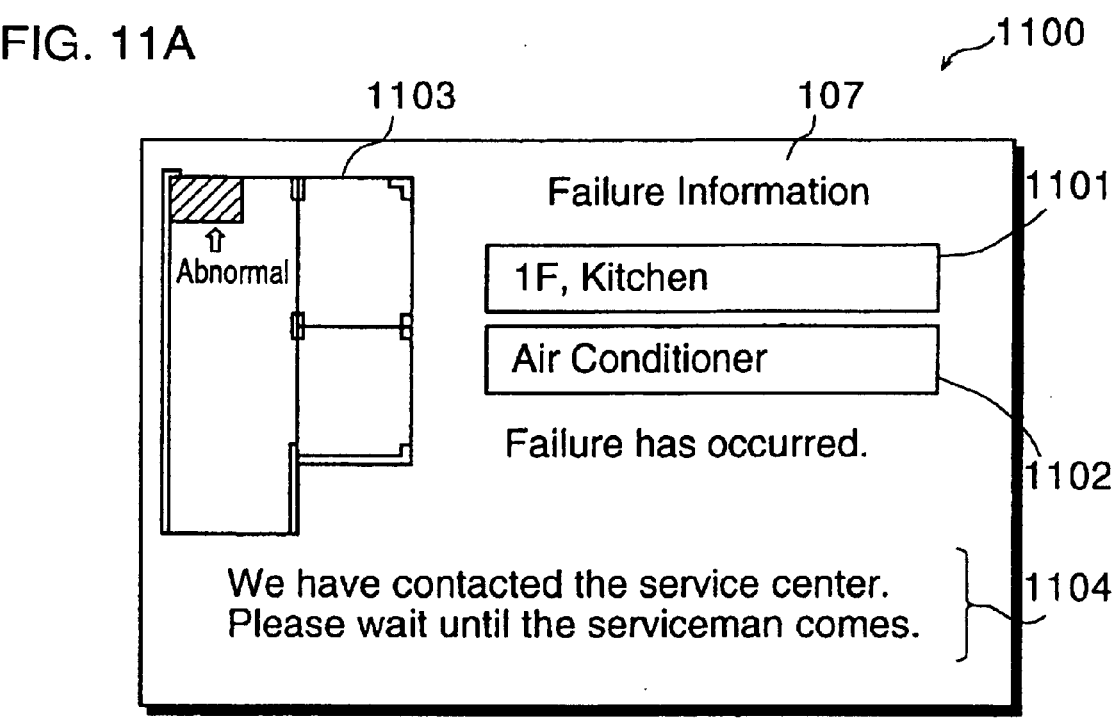
FIG. 11A is a diagram showing one example of customer repair information which is displayed on a customer display unit of a home server.
Figure 11B:
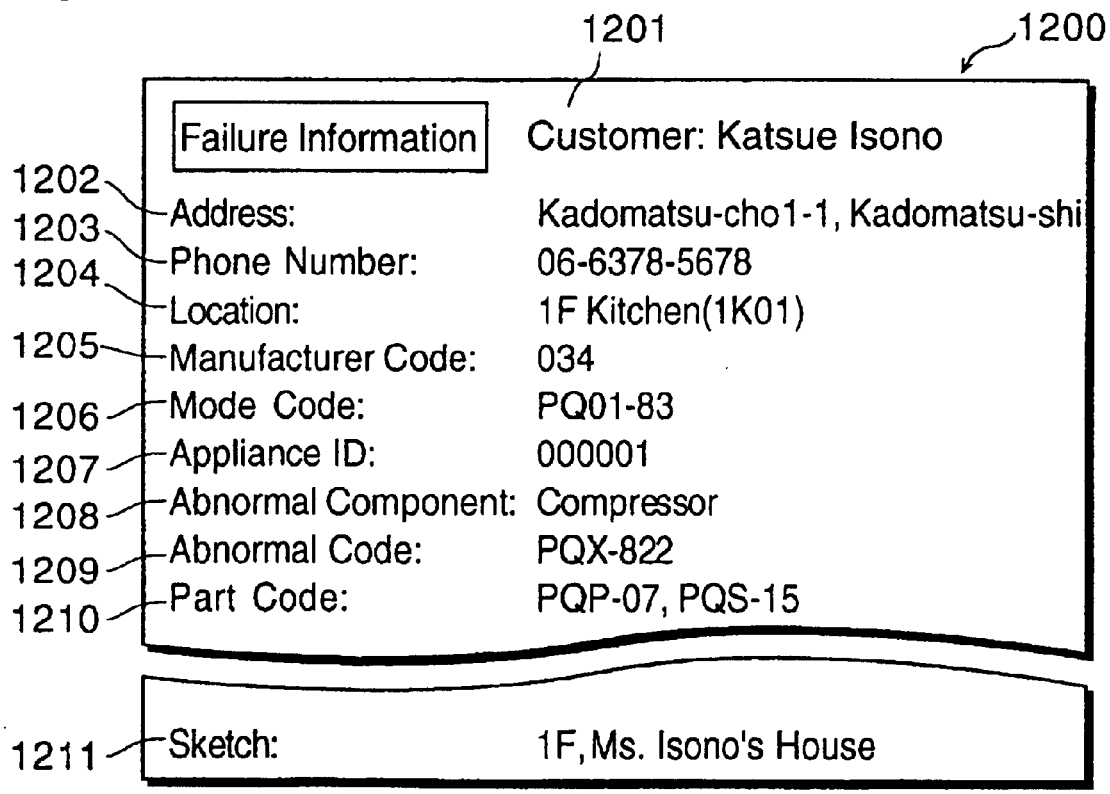
FIG. 11B is a diagram showing one example of serviceman repair information which is displayed on a center display unit of a center server.

FIG. 11A is a diagram showing one example of customer repair information 1100 which is displayed on the customer display unit 107 of the home server 101. FIG. 11B is a diagram showing one example of serviceman repair information 1200 which is displayed on the center display unit 126 of the center server 120. As shown in FIG. 11A, on the customer repair information 1100 displayed on the customer display unit 107, a connection point 1101 of the electrical appliance 102 which was decided to be failed by the failure deciding unit 106, "1F Kitchen", for example, and a failed model name 1102 indicating a type of the electrical appliance 102 which was decided as failed, "an air conditioner", for example, and others are displayed in a manner intelligible to a customer. Further, a sketch 1103 indicating the connection point 1101 of the failed appliance is displayed using the floor plan 306, and an a notice 1104 indicating an action the customer should take in the case of the failure of the electrical appliance 102, "We have contacted the service center. Please wait until the serviceman comes", for example, is also displayed. As shown in FIG. 11B, on the serviceman repair information 1200 displayed on the center display unit 126 of the center server 120, details of the repair and failure are specifically displayed for a serviceman who is actually in charge of the repair. On the serviceman repair information 1200, information is displayed such as: personal information of the customer including a name 1201 of the customer of the failed electrical appliance 102 "Katsue Isono", an address 1202 of the customer "Kadomatsu-cho 1-1, Kadomatsu-shi" and a phone number 1203 of the customer "06-6378-5678" as well as information regarding the electrical appliance 102 and details of the failure and repair including a location 1204 of the failed electrical appliance "1F Kitchen (1K01), a manufacturer code 1205 "034", a model code 1206 "PQ01-83", an appliance ID 1207 "00001", an abnormal component 1208 "compressor", an abnormal code 1209 "PQX-822" for specifying a type of the failure which can occur in the component indicated in the abnormal component 1208 and a part code 1210 for specifying a part which may require replacement for the failure indicated in the abnormal code 1209 "PQP-07, PQS-15". Further, at the bottom of the serviceman repair information 1200, an item of a sketch 1211 which contains a link to a file "00078723m1.gif" of the floor plan 306 of "1F, Ms. Isono's house" is displayed, and by clicking this, the file of the sketch 1103 as shown in FIG. 11A can be read out from the customer list DB 123 and displayed on the center display unit 126. As mentioned above, although most of the serviceman repair information 1200 is indicated by codes incomprehensible to the customer of the electrical appliance 102, the serviceman can easily specify details of the state of the applicable electrical appliance 102, failure point, repair method and others by referring to the manual for each code.

As mentioned above, according to the remote maintenance system 100 of the present embodiment, the center server 120 automatically updates the failure model 200 based on the status values of the electrical appliance 102 under normal operation every time the electrical appliance 102 gets out of order, and sends the updated failure model 200 to each home server 101. As a result, the home server 101 of each house learns a change of status values within a normal range corresponding to the secular changes and usage environment of the electrical appliance 102, and therefore there is an effect that an accurate failure decision can be made more closely in line with reality.

Further, according to the remote maintenance system 100 of the present embodiment, since the home server 101 of each house acquires status values from the electrical appliance 102 one after another according to the failure model 200 to make a failure decision, there is an effect that the failure of the electrical appliance 102 can be found in earlier stages and therefore the life of the electrical appliance 102 can be increased. When the electrical appliance 102 connected to the home LAN 110 gets out of order, the information regarding a failure of the electrical appliance 102 and the repair for the failure is quickly delivered to a customer and a serviceman. Therefore, there is an effect that, when the customer finds abnormality of the electrical appliance 102, his/her improper action can be prevented by referring to the customer display unit 107, and the serviceman can also go to repair it quickly.

Also, the home server 101 can make an accurate failure decision according to status values inside the electrical appliance 102 acquired from each electrical appliance 102, and displays accurate and specific details of the repair for a serviceman. As a result, the serviceman can take measures efficiently for the failure of the electrical appliance 102 without a particular repair skill or experience, and therefore the costs, such as personnel expenses, can be reduced.

Further, according to the remote maintenance system 100 of the present embodiment, while the information regarding the failure and repair can be displayed for a customer by an expression familiar to the customer on the customer repair information 1100, instead of detailed information of the electrical appliance 102 and the repair thereof which seems to be unnecessary to the customer, more concrete and detailed repair information can be displayed for a serviceman on the serviceman repair information 1200. As a result, there is an effect that both the customer and the serviceman can take more appropriate actions for the failure of the electrical appliance.

Note that, according to the present embodiment, the failure model 200 including parameters and programs (program portions) has been explained. However, it may include either one of them. When the home server 101 includes a program (program portion) for performing a failure decision according to a predetermined procedure, for example, the failure model 200 can include parameters only. Also, the failure model 200 may also be updated by the home server 101, autonomously move between the center server 120 and the home server 101 via the communication network 140, be executed as an agent by both of the home server 101 and the center server 120, and automatically learn.

In other words, according to the present embodiment, the failure model updating unit 127 of the center server 120 updates the standard value 205 of the failure model 200. However, the failure model 200 may be updated in the home server 101 in each house by incorporating a program (program portion) for updating the standard value 205 of the failure model 200 in each failure model 200 by vector quantization based on the normal operation combination information in the status value history DB 104. Also, instead of incorporating a program (program portion) for updating the standard value 205 of the failure model 200 in the failure model 200, a processing unit for updating the failure model 200 may be included beforehand in the home server 101. Further, by holding the customer repair information corresponding to a failure of each electrical appliance 102 in the failure model DB 103 as well, when the failure deciding unit 106 decides a failure of the electrical appliance 102, only the appliance ID 202, customer ID 301 and abnormal code 1209 of the electrical appliance 102 which is decided as having failed may be sent to the center server 120.

Also, according to the present embodiment, the failure model updating unit 127 updates the failure model 200 based on status values under normal operation and operational condition values on acquiring the status values. However, it does not always need to update based on the status values under normal operation, and may update the failure model 200 based on status values under abnormal operation.

Further, according to the present embodiment, the failure model updating unit 127 sends the updated failure model 200 to the home server 101 only which is a sender of the normal operation combination information in the case of a failure of the electrical appliance 102. However, it may send the updated failure model 200 to all of the same models of each house which has a maintenance contract with the service center. Also, the center server 120 may store the normal operation combination information which was received from the home server 101 of each house per model of the electrical appliance 102, and update the failure model 200 for all the appliances of the applicable model based on the stored combination information. As a result, there is an effect that a more general and average standard value 205 can be obtained for the same model.

Note that, according to the present embodiment, the failure model 200 corresponding to each electrical appliance 102 is held and updated when a plurality of the electrical appliances 102 of the same model are connected in the same house. However, when it is decided that the usage environment of each electrical appliance 102 is similar in each house, one failure model 200 for the appliances of the same model may be held in each house and updated every time an electrical appliance 102 is decided as having failed.

What is claimed is:

1. A remote maintenance system comprising:
a center server located in a service center for performing maintenance of an electrical appliance; and
a home server located in a house for monitoring a status of an electrical appliance in the house,
wherein the center server and the home server are connected via a communication line, the home server includes:
a status value acquiring unit operable to acquire a status value of the electrical appliance;
a failure model receiving unit operable to receive from the center server a failure model for deriving a decision as to whether or not the electrical appliance has failed from the status value; and
a failure deciding unit operable to decide whether or not the electrical appliance has failed based on the acquired status value and the received failure model, and
the center server includes a failure model updating unit operable to update the failure model and send the updated failure model to the home server.

2. The remote maintenance system according to claim 1, wherein the home server further includes:
a status value storing unit operable to store the status value at a time when the failure deciding unit decides that the electrical appliance has failed or not failed; and
a status value sending unit operable to send the stored status value to the center server, the center server further includes a status value receiving unit operable to receive the status value from the home server, and
the failure model updating unit updates the failure model based on the received status value of the electrical appliance.

3. The remote maintenance system according to claim 2, wherein the failure model includes a standard value indicating a decision basis for the failure deciding unit to make the decision.

4. The remote maintenance system according to claim 3, wherein the failure model includes a program, and
the failure deciding unit uses the program to decide whether or not the electrical appliance has failed using the standard value and the status value.

5. The remote maintenance system according to claim 4, wherein the failure model updating unit updates the standard value using a vector quantization method based on the status value.

6. The remote maintenance system according to claim 5, wherein the standard value indicates a normal range of a relationship between the status value stored in the status value storing unit and a preset condition of the electrical appliance at the time when the status value is acquired.

7. The remote maintenance system according to claim 6, wherein when the electrical appliance is an air conditioner, the standard value of the failure model for the air conditioner includes an upper limit value of a compressor rotational frequency during a cooling operation and a heating operation of the air conditioner, and the failure deciding unit decides that the air conditioner has failed when the compressor rotational frequency during the cooling operation or the heating operation of the air conditioner exceeds the upper limit value.

8. The remote maintenance system according to claim 6, wherein the standard value includes a coefficient of a curve indicating a boundary between a normal range and an abnormal range when a pair of the status value and the preset condition is plotted on a multi-dimensional coordinate.

9. The remote maintenance system according to claim 8, wherein the failure model updating unit updates the coefficient of the curve by a least squares method based on a plurality of points indicating pairs of status values and preset conditions on the multi-dimensional coordinate.

10. The remote maintenance system according to claim 8, wherein when the electrical appliance is an air conditioner, the preset condition is a temperature difference between a preset temperature and a room temperature during a cooling operation or a heating operation of the air conditioner, and the status value is a lapsed time until the room temperature reaches the preset temperature.

11. The remote maintenance system according to claim 8, wherein the the failure deciding unit uses the program to decide whether or not the electrical appliance has failed by deciding whether a point indicating the pair of the preset condition and the status value on the multi-dimensional coordinate is located within the normal range of the curve.

12. The remote maintenance system according to claim 11, wherein the failure model includes another program, and
the status value acquiring unit uses the other program to acquire a predetermined status value at a predetermined timing.

13. The remote maintenance system according to claim 12,
wherein the home server further includes a customer display unit operable to display customer failure information of the electrical appliance,
the failure deciding unit sends information specifying contents of a failure of the electrical appliance to the center server when the failure deciding unit decides that the electrical appliance has failed, and
the center server further includes:
a holding unit operable to hold different contents of failure information which are prepared beforehand for a customer and a serviceman separately corresponding to a failure which can occur per model of electrical appliance;
failure information sending unit operable to receive the information specifying contents of the failure of the electrical appliance, specify failure information for a customer among the contents of failure information held in the holding unit, and send the specified customer failure information to the home server; and
a serviceman display unit operable to receive the information specifying contents of the failure of the electrical appliance, specify failure information for a serviceman among the contents of failure information held in the holding unit, and display the specified serviceman failure information for a serviceman.

14. The remote maintenance system according to claim 13,
wherein the failure model receiving unit receives the failure model corresponding to the electrical appliance from the center server,
the failure deciding unit decides a failure of the electrical appliance according to the failure model corresponding to the electrical appliance, and
the failure model updating unit sends to the home server the updated failure model with an indication of the corresponding electrical appliance which has been decided as having failed.

15. The remote maintenance system according to claim 14,
wherein the home server further includes:
a new electrical appliance detecting unit operable to detect an electrical appliance which is newly connected to the home server; and
a failure model requesting unit operable to request the center server to send a failure model corresponding to the new electrical appliance when the new electrical appliance is detected,
the failure model receiving unit receives the requested failure model, and
the failure deciding unit decides whether or not the new electrical appliance has failed using the received failure model.

16. The remote maintenance system according to claim 13,
wherein the home server further includes a failure model holding unit operable to hold a failure model for each model of electrical appliance located in the house, and
the failure deciding unit decides whether or not an electrical appliance has failed using a corresponding failure model.

17. The remote maintenance system according to claim 16,
wherein the center server further includes:
an appliance information holding unit operable to hold information regarding each house of one or more customers having a maintenance contract with the service centerfor an electric appliance in which the electrical appliance is located; and
a failure model distributing unit operable to specify each house having the electrical appliance corresponding to the updated failure model by referring to the information held in the appliance information holding unit, and distribute the updated failure model to the home server of each specified house.

18. A remote maintenance system comprising:
a center server located in a service center for performing maintenance of an electrical appliance; and
a home server located in a house for monitoring a status of an electrical appliance in the house,
wherein the center server and the home server are connected via a communication line, the home server includes:
a status value acquiring unit operable to acquire a status value of the electrical appliance;
a failure model receiving unit operable to receive from the center server a failure model for deriving a decision as to whether or not the electrical appliance has failed from the status value;
a failure deciding unit operable to decide whether or not the electrical appliance has failed based on the acquired status value and the received failure model; and a failure model updating unit operable to update the failure model based on the status value of the electrical appliance, wherein the failure deciding unit further decides whether or not the electrical appliance has failed based on the acquired status value and the updated failure model.

19. The remote maintenance system according to claim 18, wherein the failure model includes a standard value indicating a decision basis for the failure deciding unit to make the decision.

20. The remote maintenance system according to claim 19, wherein the failure model includes a program; and the failure deciding unit uses the program to decide whether or not the electrical appliance has failed using the status value and the standard value.

21. The remote maintenance system according to claim 20, wherein the failure model updating unit updates the standard value based on the status value using a vector quantization method.

22. The remote maintenance system according to claim 21, wherein the home server further includes a status value storing unit operable to store the status value at a time when the failure deciding unit decides that the electrical appliance has not failed, the standard value is a coefficient of a primary curve indicating a standard of a normal range when a pair of the status value stored in the status value storing unit and a preset condition at the time when the status value is acquired is plotted on a two-dimensional coordinate, and the failure model updating unit updates the coefficient of the primary curve by a least squares method based on a point indicating the status value and the preset condition on the two-dimensional coordinate.

23. The remote maintenance system according to claim 22, wherein the failure model includes another program, and the status value acquiring unit uses the other program to acquire a predetermined status value at a predetermined timing.

24. The remote maintenance system according to claim 23, wherein the home server further includes a customer display unit operable to display customer failure information of the electrical appliance, the failure deciding unit sends information specifying contents of a failure of the electrical appliance to the center server when the failure deciding unit decides that the electrical appliance has failed, and the center server further includes:

a holding unit operable to hold different contents of failure information which are prepared beforehand for a customer and a serviceman separately corresponding to a failure which can occur per model of electrical appliance;

a failure information sending unit operable to receive the information specifying contents of the failure of the electrical appliance, specify failure information for a customer among the contents of failure information held in the holding unit, and send the specified customer failure information to the home server; and a serviceman display unit operable to receive the information specifying contents of the failure of the electrical appliance, specify failure information for a serviceman among the contents of failure information held in the holding unit, and display the specified serviceman failure information for a serviceman.

25. A remote maintenance method for a remote maintenance system having a center server located in a service center for performing maintenance of an electrical appliance, and a home server located in a house for monitoring a status of an electrical appliance in the house, wherein the center server and the home server are connected via a communication line, the remote maintenance method comprising:

receiving, at the home server from the center server, a failure model for deriving a decision as to whether or not an electrical appliance has failed from a status value of the electrical appliance;

acquiring, at the home server, the status value;

deciding, at the home server, a failure of the electrical appliance based on the acquired status value and the received failure model sending, from the home server, the acquired status value to the center server;

receiving, at the center server, the status value from the home server; and updating, at the center server, the failure model based on the received status value of the electrical appliance, and sending the updated failure model to the home server.

26. The remote maintenance method according to claim 25, wherein the deciding of the failure further includes sending information specifying contents of the failure of the electrical appliance to the center server when decided that the electrical appliance has failed, and the remote maintenance method further comprises:

receiving at the center server, the information specifying contents of the failure of the electrical appliance, and specifying failure information for a customer and a serviceman in the holding unit;

reading out, at the center server, the specified customer failure information for a customer from the holding unit that holds different contents of failure information which are prepared beforehand for a customer and a serviceman separately corresponding to a failure which can occur per model of electrical appliance, and sending the specified customer failure information for a customer to the home server;

reading out, at the center server, the specified serviceman failure information for a serviceman from the holding unit, and displaying the read-out serviceman failure information for a serviceman; and displaying, at the home server, the received customer failure information for a customer.

27. The remote maintenance method according to claim 25, further comprising:

detecting, at the home server, an electrical appliance which is newly connected to the home server; and requesting, at the home server, the center server to send a failure model corresponding to the new electrical appliance when the new electrical appliance is detected, wherein the failure model requested in the requesting of the failure model corresponding to the new electrical appliance is received in the receiving of the failure model.

28. A home server for connection via a communication line with a center server which is located in a service center for performing maintenance of an electrical appliance, and for monitoring a status of an electrical appliance in a house, the home server comprising:
- a status value acquiring unit operable to acquire a status value of an electrical appliance;
- a failure model receiving unit operable to receive from the center server a failure model for deriving a decision as to whether or not the electrical appliance has failed from the status value; and
- a failure deciding unit operable to decide whether or not the electrical appliance has failed based on the acquired status value and the received failure model,
- wherein the failure deciding unit decides whether or not the electrical appliance has failed according to an updated failure model after the failure deciding unit receives the updated failure model from the center server.

29. The home server according to claim 28, further comprising:
- a status value storing unit operable to store the status value at a time when the failure deciding unit decides that the electrical appliance has failed or not failed; and
- a status value sending unit operable to send the stored status value to the center server,
- wherein the failure deciding unit makes the decision according to the updated failure model using the status value which is sent from the status value sending unit.

30. The home server according to claim 29, wherein the failure model includes a standard value indicating a decision basis for the failure deciding unit to make the decision.

31. The home server according to claim 30, wherein the failure model includes a program, and the failure deciding unit uses the program to decide whether or not the electrical appliance has failed using the standard value and the status value.

32. The home server according to claim 31, wherein the standard value indicates a normal range of a relationship between the status value stored in the status value storing unit and a preset condition of the electrical appliance at the time when the status value is acquired.

33. The home server according to claim 32, wherein the standard value includes a coefficient of a curve indicating a boundary between a normal range and an abnormal range when a pair of the status value and the preset condition is plotted on a multi-dimensional coordinate.

34. The home server according to claim 33, wherein the failure model receiving unit receives the failure model corresponding to the electrical appliance from the center server, and the failure deciding unit decides a failure of the electrical appliance according to the failure model corresponding to the electrical appliance.

35. A center server for connection with a home server for monitoring a status of an electrical appliance in a house via a communication line, the center server being located in a service center for performing maintenance of an electrical appliance, the center server comprising:
- a status value receiving unit operable to receive from the home server a status value, a value of an electrical appliance at a time when decided that the electrical appliance has failed or not failed, which is stored in the home server; and
- a failure model updating unit operable to update a failure model for deriving a decision as to whether or not the electrical appliance has failed from the status value based on the received status value of the electrical appliance, and send the updated failure model to the home server.

36. A program for a home server connected with a center server which is located in a service center for performing maintenance of an electrical appliance via a communication line, the home server for monitoring a status of an electrical appliance in a house, the program comprising:
- a status value acquiring program portion operable to allow the home server to acquire a status value of an electrical appliance;
- a failure model receiving program portion operable to allow the home server to receive from the center server a failure model for deriving a decision as to whether or not the electrical appliance has failed from the status value; and
- a failure deciding program portion operable to allow the home server to decide whether or not the electrical appliance has failed based on the acquired status value and the received failure model,
- wherein the failure deciding program portion allows the home server to decide whether or not the electrical appliance has failed according to the updated failure model after the failure deciding program portion allows the home server to receive the updated failure model from the center server.

37. A program for a center server which is connected with a home server for monitoring a status of an electrical appliance in a house via a communication line, the center server being located in a service center for performing maintenance of an electrical appliance, the program comprising:
- a status value receiving program portion operable to allow the center server to receive from the home server a status value, a value of an electrical appliance at a time when decided that the electrical appliance has failed or not failed, which is stored in the home server; and
- a failure model updating program portion operable to allow the center server to update a failure model for deriving a decision as to whether or not the electrical appliance has failed from the status value based on the received status value of the electrical appliance, and send the updated failure model to the home server.

* * * * *

UNITED STATES PATENT AND TRADEMARK OFFICE
CERTIFICATE OF CORRECTION

PATENT NO. : 6,772,096 B2
DATED : August 3, 2004
INVENTOR(S) : Takashi Murakami et al.

It is certified that error appears in the above-identified patent and that said Letters Patent is hereby corrected as shown below:

Column 19,
Line 52, insert -- a -- before "failure information".

Column 20,
Line 40, replace "centerfor" with -- center for --.

Column 22,
Line 2, replace "ofthe" with -- of the --.
Line 22, replace "model" with -- model; --.
Line 37, replace "receiving" with -- receiving, --.

Column 23,
Line 3, replace "ofan" with -- of an --.

Column 24,
Line 19, replace "ofan" with -- of an --.

Signed and Sealed this

Fourteenth Day of December, 2004

JON W. DUDAS
*Director of the United States Patent and Trademark Office*